June 6, 1933.  H. O. EWING  1,912,574
ENGINE
Filed Jan. 8, 1930     2 Sheets-Sheet 1

Herbert O. Ewing
Inventor
By C.A.Snow & Co.
Attorneys.

Patented June 6, 1933

1,912,574

UNITED STATES PATENT OFFICE

HERBERT O. EWING, OF MIDDLEPORT, OHIO, ASSIGNOR OF ONE-HALF TO THOMAS W. FIELD, OF CHARLESTON, WEST VIRGINIA

ENGINE

Application filed January 8, 1930. Serial No. 419,356.

This invention relates to two-cycle internal combustion engines.

It is well-known to those skilled in the art that when it is desired to operate an engine of this type at low speeds without a load or even with a light load, the engine loses control of the gas pressures in the combustion chamber, resulting in fouling of the charges and consequent misfiring. This result is due to the fact that at no-load or idling speeds only very small charges are necessary to keep the engine turning. When these charges are exploded they are capable of very little expansion which is barely sufficient to keep the engine turning. These small charges, after they have reached their maximum expansion, will cool very rapidly. The longer the stroke of the piston the cooler the gases will become before the exhaust port is opened. Consequently the subatmospheric pressure in the cylinder will increase to such an extent that when the exhaust port is finally opened, there will be a rush of burned gases back into the combustion chamber to relieve the subatmospheric pressure. Thus, with the burned gases filling the cylinder, enough fuel mixture is not taken into the engine to cause an explosion and a mis-fire will result, causing irregular firing, inefficient operation, and damage to the engine.

It is an object of the present invention to provide a means whereby the exhaust of gases is controlled so that when a subatmospheric pressure is created in the combustion chamber due to a small charge of gas fed to the engine operating at low speed, the exhaust valve will be closed before port is reached and held closed by said subatmospheric pressure acting on piston and the inrush of burned gases on valve, until a charge is taken in on the next stroke of sufficient volume to produce the desired explosion and exhaust of gases.

A further object is to provide a two-cycle engine which, by the control of the exhaust, will operate evenly and practically like a four-cycle engine during idling or light load conditions.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings.

Figure 1:
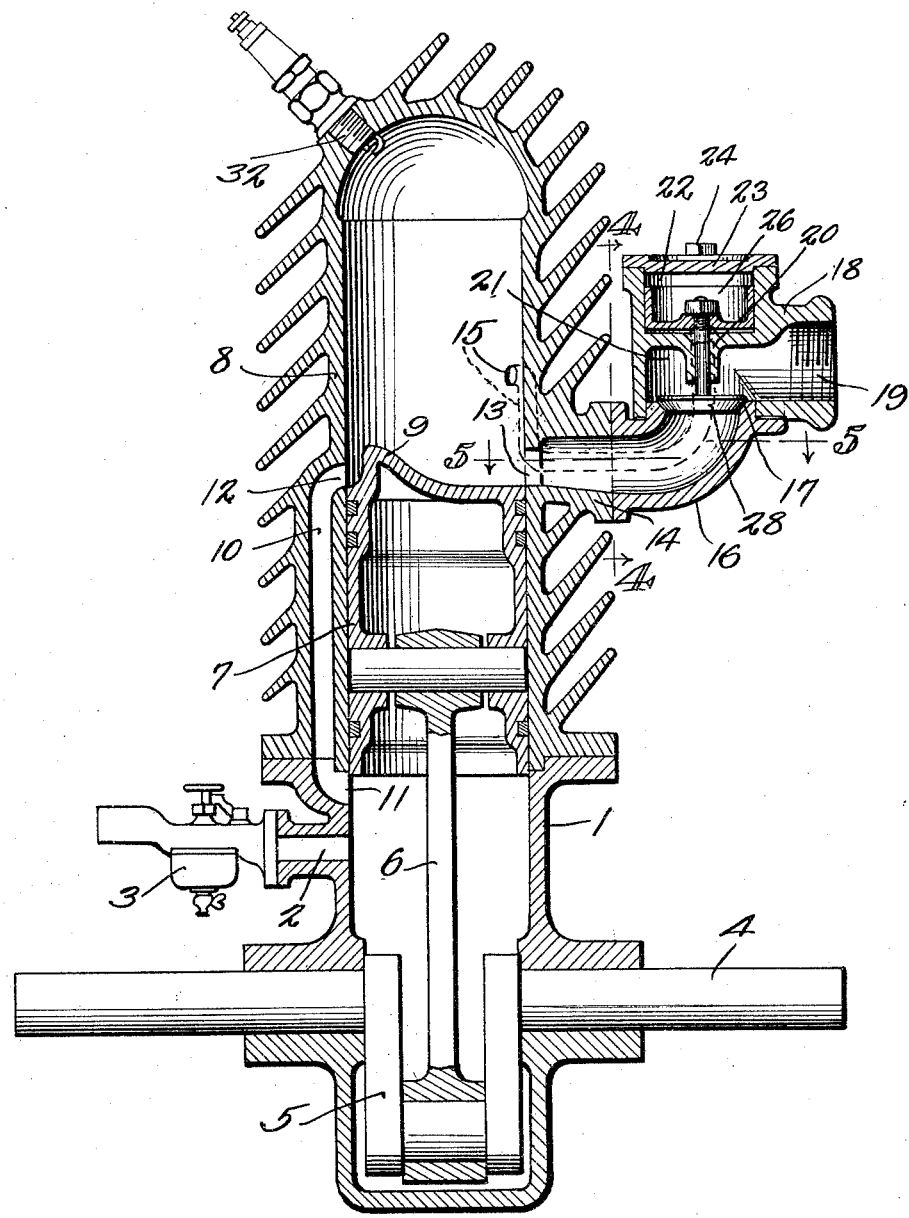
Figure 1 is a section through the engine having the present improvements combined therewith.
Figure 3:
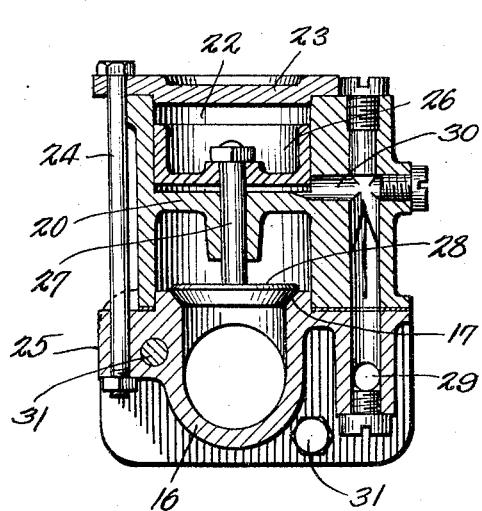
Figure 3 is a section on line 3—3, Figure 2.
Figure 4:
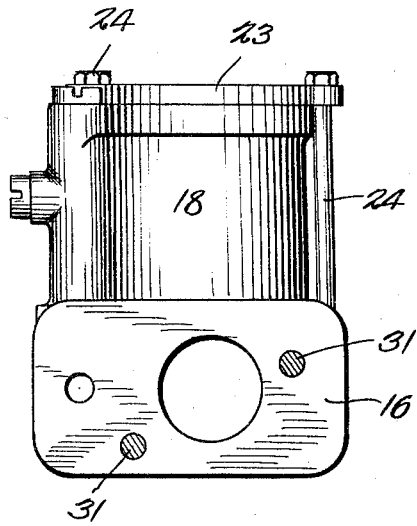
Figure 4 is a section on line 4—4, Figure 1.
Figure 5:
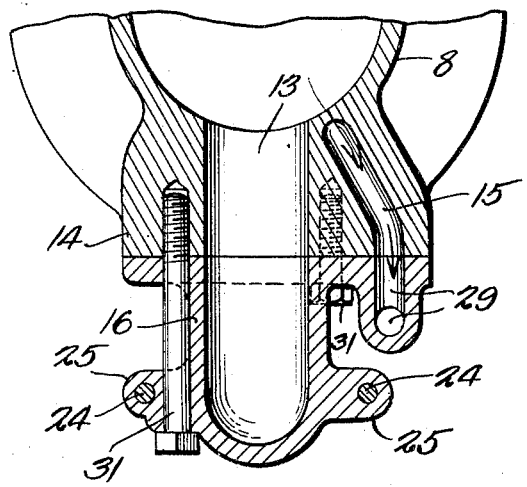
Figure 5 is a section on line 5—5, Figure 1.
Figure 2:
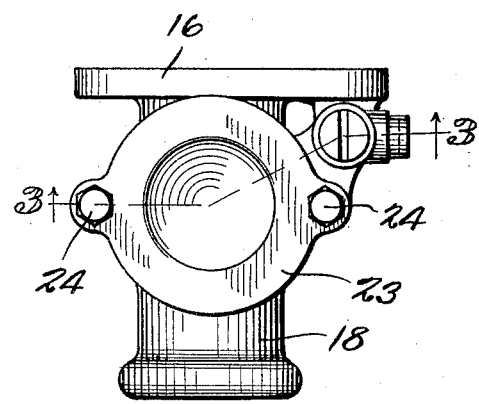
Figure 2 is a top plan view of the housing of the exhaust controlling means.

Referring to the figures by characters of reference, 1 designates the crank case of a two-cycle engine provided with the usual fuel intake 2 leading from a carburetor 3. In this crank case is journaled the shaft 4 of the engine having a crank 5 on which is mounted the piston rod or connecting rod 6. A piston 7 is slidably mounted in the cylinder 8 of the engine and is pivotally attached to the connecting rod in the usual way. This piston has a deflector 9 on its head close to the wall of the cylinder 8.

The cylinder 8, which can be either air-cooled or water-cooled, has a longitudinal transfer passage 10 in its wall, there being an intake port 11 at one end of the passage opening into the crank case while an outlet port 12 is provided at the other end of the passage and opens into the cylinder 8. This port is so located that when the piston is in its full retracted position fuel entering the cylinder from port 12 will flow against the deflector 9 and be directed thereby longitudinally of the cylinder and away from the piston. As soon as the piston starts its compression stroke it begins to close the port 12. This will be obvious by referring to Figure 1.

An exhaust port 13 is formed in the cylinder wall at a point diametrically opposite the port 12. In the structure illustrated this exhaust port opens through a boss or enlargement 14 formed integral with the cylinder.

A by-pass 15 is formed in the wall of the cylinder and within the enlargement or boss 14 and opens into the cylinder at a point between the extreme positions of the piston head. The other end of this by-pass opens through the boss or enlargement 14.

Bolted or otherwise secured to the enlargement or boss 14 is the lower member 16 of a valve casing one end of which forms a valve seat as shown at 17. The upper member of the valve casing has been indicated at 18 and is fitted snugly about the seat portion 17 of the lower member 16 and has an outlet 19 for the escape of burned gases to the atmosphere. A partition 20 is formed in the upper member 18 and is spaced from the seat 17. This partition serves to divide the upper member 18 of the valve casing into an outlet passage leading to the opening 19, said passage being indicated at 21, and a cylindrical piston chamber 22. This chamber is closed by a head 23 connected by bolts 24 to projecting lugs 25 on the lower member 16 of the valve casing. Thus when these bolts are tightened the parts 16, 18, and 23 will be held together tightly.

A supplemental piston 26 is mounted in the chamber 22. Secured to this piston so as to move therewith is the stem 27 of an exhaust valve 28. This stem is slidable within and guided by the partition 20 and the valve 28 is normally in engagement with the seat 17. At this time piston 26 is supported close to but out of contact with the inner end of the chamber 22.

The by-pass 15 has a continuation thereof indicated at 29 and formed in the members 16 and 18 of the valve casing. This continuation of the by-pass opens at 30 into the inner end portion of the supplemental piston chamber 22. Thus there is constant communication between the inner end portion of chamber 22 and that end of the by-pass 15 opening into the cylinder 8.

As before stated, the member 16 of the valve casing can be attached to cylinder 8 by means of bolts. These bolts have been illustrated at 31 and are easily accessible for the purpose of attaching or removing the exhaust mechanism.

In operation it can be assumed that the engine is throttled down for slow rotation without a load or with no load. When the piston 7 moves to the position shown in Figure 1 it will create a subatmospheric pressure which will be extended to piston 23 through by-pass 15 with the result that valve 28 will be held on its seat. As the port 12 is uncovered, the small charge of fuel will enter cylinder 8 from the transfer passage 10. When the piston moves on its compression stroke, the charge will be compressed and fired but, due to the small amount of fuel which has been supplied to the cylinder in order that the engine may operate at a slow speed, the rapid cooling and expansion of this small charge following the explosion will create a subatmospheric pressure in the combustion chamber with the result that valve 28 will be closed and thereby prevent burned gases from rushing back into the cylinder. Consequently, the new charge of fuel entering the cylinder from the transfer port 10 will not be fouled by inrushing burned gases, as would be the case should the exhaust port remain open to the atmosphere.

If, during the compression stroke of the piston, the mixture in the cylinder 8 should be so lean that no explosion would result, said piston, on its return to the position shown in Figure 1, would leave a subatmospheric pressure in the cylinder so that another small charge of fuel can enter. On the next or second compression stroke of the piston there would be sufficient fuel (a double quantity of a small charge) to insure an explosion. As the piston then moves back under the force of the explosion, the burned gas, under high pressure, will expand into the uncovered by-pass 15 and cause the valve 28 to unseat. Therefore, the exhaust port 13, when uncovered, will permit the burned gases to escape past the open valve 28, this gas being displaced by the small fresh charge of fuel which, on entering from port 12, will strike the deflector 9 and be dissipated toward the end of the cylinder. The operation described will then be repeated and when the piston next returns to the position shown, the rapidly cooled and contracted gas in the cylinder will again produce a subatmospheric pressure which can only be built up by compression following the closing of port 13 or by the addition of new charge as heretofore explained.

It has been found in practice that an engine operating as described under no load or a small load will act just as efficiently as a four-cycle engine. Furthermore, in this device all danger of fouling the new charge of gas is avoided and misfiring is eliminated.

What is claimed is:

1. A two-cycle internal combustion engine including a cylinder having a fuel intake port and an exhaust port, a valve for the exhaust port, a piston connected to the valve, a chamber for said piston, a by-pass leading from said chamber to the cylinder at a point between the exhaust port and the cylinder head, a piston in the cylinder for opening and closing the ports and the by-pass, said by-pass constituting means for transmitting a subatmospheric pressure from the cylinder to the valve piston to hold the valve closed and for transmitting a pressure above atmospheric from the cylinder to the valve piston to open the valve.

2. A two-cycle internal combustion engine including a cylinder, a crank case, a fuel transfer passage leading from the crank case to the cylinder, an exhaust port, a valve therein, a piston connected to the valve, a piston in the cylinder, and means controlled by said cylinder piston and opening into the cylinder between the exhaust port and the cylinder head for transmitting subatmospheric pressure from the cylinder to the valve piston to hold the valve closed and for transmitting to said valve piston pressures above atmospheric to open the valve.

3. A two-cycle internal combustion engine including a cylinder having an exhaust port controlled by the piston of the engine and a by-pass opening into said cylinder, and means controlled by pressure in the engine for preventing inrush of gases through said port when the port is opened by the piston and the pressure in the cylinder is below atmospheric pressure, said means including a valve and a movable element connected to the valve and operated by variations of pressures in the by-pass.

4. A two-cycle internal combustion engine including a cylinder having an exhaust port, a piston in the cylinder controlling the port, a valve for said port, and means separate from the exhaust port and under the control of the piston for opening the exhaust valve when the pressure in the engine is above atmospheric, and closing the valve against return of burned gases through the exhaust port during sub-atmospheric pressure in the engine, said means including a by-pass opening into the cylinder and a device connected to the valve and shiftable by variations in pressures in the by-pass, thereby to actuate the valve.

In testimony that I claim the foregoing as my own, I have hereto affixed my signature.

HERBERT O. EWING.